(12) United States Patent
Yu

(10) Patent No.: US 7,782,755 B2
(45) Date of Patent: Aug. 24, 2010

(54) METHOD FOR UPLINK COLLABORATIVE SDMA USER PAIRING IN WIMAX

(75) Inventor: Xiaoyong Yu, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 166 days.

(21) Appl. No.: 11/962,132

(22) Filed: Dec. 21, 2007

(65) Prior Publication Data

US 2009/0161527 A1    Jun. 25, 2009

(51) Int. Cl.
*H04J 11/00* (2006.01)
(52) U.S. Cl. .................. 370/208; 370/310; 370/334
(58) Field of Classification Search ......... 370/203–211, 370/252, 310, 328, 329, 334
See application file for complete search history.

(56) References Cited

U.S. PATENT DOCUMENTS

| | | | | |
|---|---|---|---|---|
| 5,515,378 | A * | 5/1996 | Roy et al. ............... | 370/334 |
| 5,886,988 | A * | 3/1999 | Yun et al. ............... | 370/329 |
| 7,020,110 | B2 * | 3/2006 | Walton et al. ........... | 370/334 |
| 7,047,016 | B2 * | 5/2006 | Walton et al. ........... | 455/452.1 |
| 7,206,550 | B2 * | 4/2007 | Li et al. ................ | 455/69 |
| 7,257,088 | B2 * | 8/2007 | Van Erven .............. | 370/252 |
| 7,298,805 | B2 * | 11/2007 | Walton et al. ........... | 375/347 |
| 2003/0125040 | A1 * | 7/2003 | Walton et al. ........... | 455/454 |
| 2006/0039312 | A1 * | 2/2006 | Walton et al. ........... | 370/319 |
| 2007/0092019 | A1 | 4/2007 | Kotecha et al. | |
| 2007/0153760 | A1 * | 7/2007 | Shapira ................. | 370/350 |
| 2007/0177681 | A1 | 8/2007 | Choi et al. | |
| 2007/0274256 | A1 * | 11/2007 | Murai et al. ............ | 370/328 |
| 2008/0316955 | A1 * | 12/2008 | Yu ..................... | 370/319 |
| 2009/0067382 | A1 * | 3/2009 | Li et al. ................ | 370/330 |
| 2009/0124290 | A1 * | 5/2009 | Tao et al. .............. | 455/562.1 |

FOREIGN PATENT DOCUMENTS

WO    2007021153 A1    2/2007

OTHER PUBLICATIONS

Serbetli, Semih et al.: Time-Slotted Multiuser MIMO Systems: Beamforming and Scheduling Strategies, EURASIP Journal on Wireless Communications and Networking 2004:2, 286-296.
Ochiai, Hideki et al.: Collaborative Beamforming for Distributed Wireless Ad Hoc Sensor Networks, IEEE Transactions on Signal Processing, vol. 53, No. 11, Nov. 2005, pp. 4110-4154.
WIMAX XX xxx xxx v1.12.0(Jul. 2006), WiMAX Forum Mobile System Profile, WiMAX Forum, 2006 WMAX Forum, Doc. No. WiMAXX XX xxx xxx v.1.1.0, pp. 1-91.

* cited by examiner

*Primary Examiner*—Chi H Pham
*Assistant Examiner*—Robert Lopata

(57) ABSTRACT

A method, system, and communication network for grouping a pair of independent information signals on the same time-frequency orthogonal frequency division multiplexing (OFDM) resources for uplink (UL) collaborative SDMA, in a wireless communication system. An uplink scheduling (ULS) utility employs an estimated channel gain associated with the transmission path(s) of each user to create a pairing metric that effectively computes the correlation between each pair of independent information signals on a specific sub-carrier frequency channel. Pairs of information signals are considered as possible groupings when the values of the corresponding pairing metrics are less than a threshold maximum value. An optimal selection of final pairings is based on the relative values of the pairing metric(s) and other priority conditions which may include quality of service requirements. The ULS utility enables the UL scheduler to pair information signals with a clear spatial distinction and minimal correlation.

20 Claims, 8 Drawing Sheets

Equation 5: $\mathbf{H}(k)_u = [H(k)_{1,u} \ H(k)_{2,u} \ \cdots \ H(k)_{N,u}]^t$ Equation 6: $[\mathbf{H}(k)_u \ \mathbf{H}(k)_v] = [\mathbf{H}(k)_u]^H \times [\mathbf{H}(k)_u \ \mathbf{H}(k)_v] = \begin{bmatrix} r_{1,1} & r_{1,2} \\ r_{2,1} & r_{2,2} \end{bmatrix}$ Equation 7: $M(k)_{u,v} = \frac{1}{2}\left(\frac{|r_{1,2}|}{r_{1,1}}\sqrt{\frac{P_u}{P_v}} + \frac{|r_{2,1}|}{r_{2,2}}\sqrt{\frac{P_v}{P_u}}\right)$ Equation 8: $M_{u,v} = \frac{1}{K}\sum_{k \in K} M(k)_{u,v} \leq T$

FIG. 7

METHOD FOR UPLINK COLLABORATIVE SDMA USER PAIRING IN WIMAX

BACKGROUND

1. Technical Field

The present invention generally relates to wireless communication systems and in particular to scheduling information signals in wireless communication systems.

2. Description of the Related Art

Uplink (UL) Collaborative Spatial Division Multiple Access (SDMA) is one of the advanced features in mobile Worldwide Interoperability for Microwave Access (WiMAX), where two different single-antenna subscribers share the same Orthogonal Frequency Division Multiplexing (OFDM) time-frequency resources, transmitting independent data streams. Conventionally, any two users were randomly paired on a frame basis for the UL SDMA. This blind/random scheduling method simplifies implementation and reduces the impact of pairing two incompatible user signals in each frame. Unfortunately, blind scheduling results in system performance degradation, which means less system throughput or capacity.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 7 illustrates a set of equations utilized in the creation of a UL SDMA pairing metric according to one embodiment of the invention.

DETAILED DESCRIPTION OF AN ILLUSTRATIVE EMBODIMENT

Figure 1:
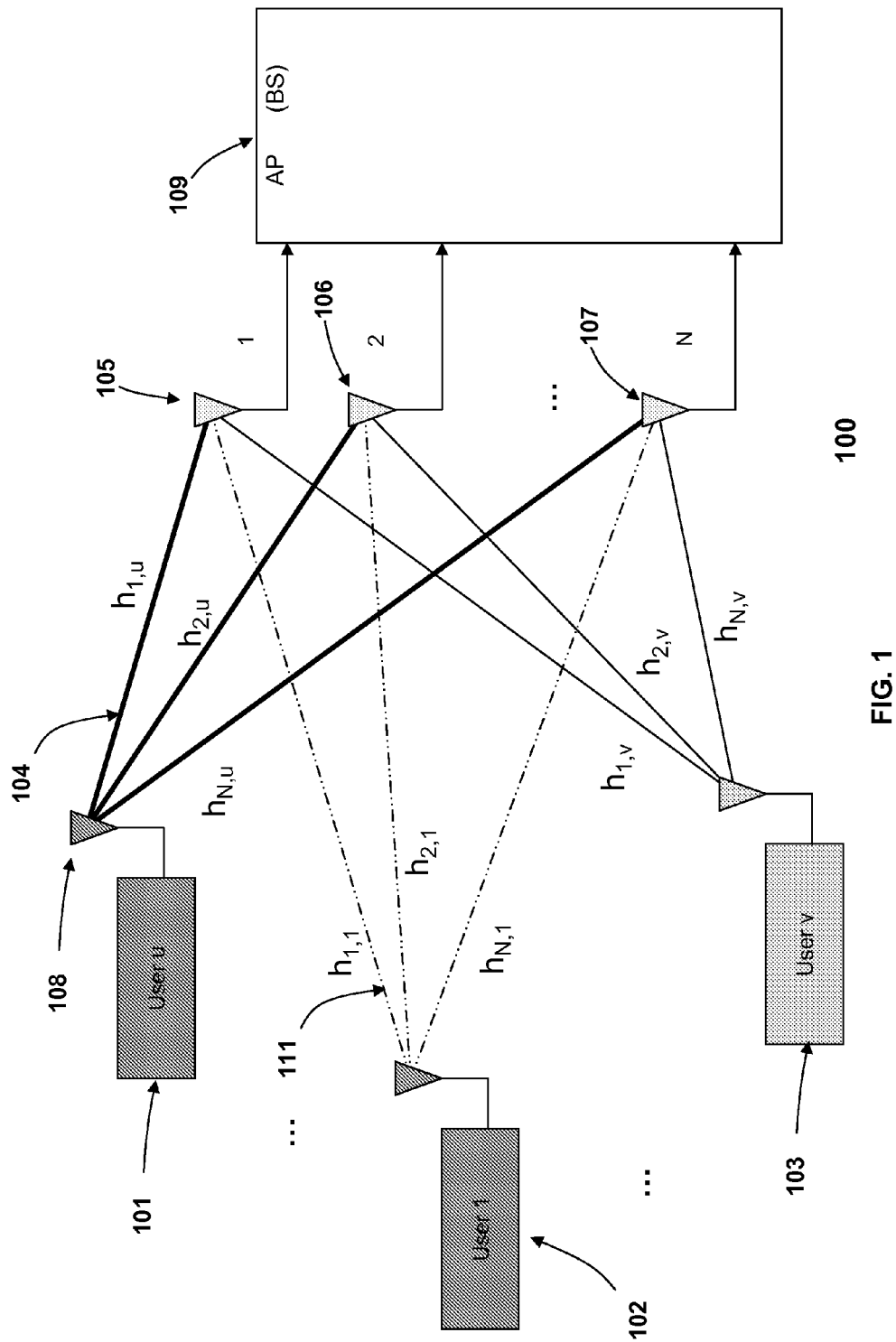
FIG. 1 is a block diagram representation of a wireless communication system which employs uplink collaborative spatial division multiple access (SDMA), according to one embodiment of the invention.

The illustrative embodiments provide a method, system, and communication network for grouping a pair of independent information signals on the same time-frequency orthogonal frequency division multiplexing (OFDM) resources for uplink (UL) collaborative SDMA in a wireless communication system. An uplink scheduling (ULS) utility employs an estimated channel gain associated with the transmission path(s) of each user to create a pairing metric that effectively computes the correlation between each pair of independent information signals on a specific sub-carrier frequency channel. Pairs of information signals are considered as possible groupings when the values of the corresponding pairing metrics are less than a threshold maximum value. An optimal selection of final pairings is based on the relative values of the pairing metric(s) and other priority conditions, which may include quality of service requirements. The ULS utility enables the UL scheduler to pair information signals with clear spatial distinction and minimal correlation.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIGS. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to FIG. 1, a wireless communication system which employs uplink collaborative SMDA is illustrated according to one embodiment of the invention. System 100 comprises a number ("L") of mobile users/subscribers, for example, a user u 101, a user 1 102 and a user v 103, which all connect to a base-station 109 via a number ("N") of receiving antennas, for example, antenna 1 105, antenna 2 106, and antenna N 107 (three shown). The base station 109 is illustrated and referred to herein as access point (AP). AP 109 includes a transceiver which comprises receiver and transmitter sections (not shown in FIG. 1). Each user u, 1, and v uses a corresponding mobile antenna to transmit an independent information/data signal to AP 109, for example, user u 101 utilizes (single) mobile antenna u 108 to transmit to AP 109. System 100 also comprises "N" channels/paths by which each user (e.g., user u 101, user 1 102, and user v 103) transmits an information signal to AP 109. For example, with respect to antenna 1, the group of "N" paths includes a path $h_{1,u}$ 104 which connects user u 101 to AP 109 via antenna 1 105, a path $h_{1,1}$ 111 which connects user 1 102 to AP 109 via antenna 1 105, and a path $h_{1,v}$ which connects user v 103 to AP 109 via antenna 1 105.

In system 100, each one of the "L" (single antenna) mobile users 101, 102, 103 transmits an independent information signal to AP 109, which has "N" receiving antennas. Mobile users 101, 102, 103 are able to transmit on the same channels various types of data in the form of images, video, speech, music, data, etc., and from various devices including cell phones, laptops, personal digital assistants (PDAs), game devices, etc. System 100 may employ uplink (UL) collaborative SDMA, a characteristic of mobile WiMAX technology, in which two independent subscriber signals share the same orthogonal frequency division multiple access (OFDM) time-frequency resources. AP 109 may receive signals from each of the "L" users on each of the "N" antennas. In order to facilitate a complete description of system 100 and particularly the functionality of AP 109 provided by the invention, a more detailed illustration is presented in FIG. 2.

Figure 2:
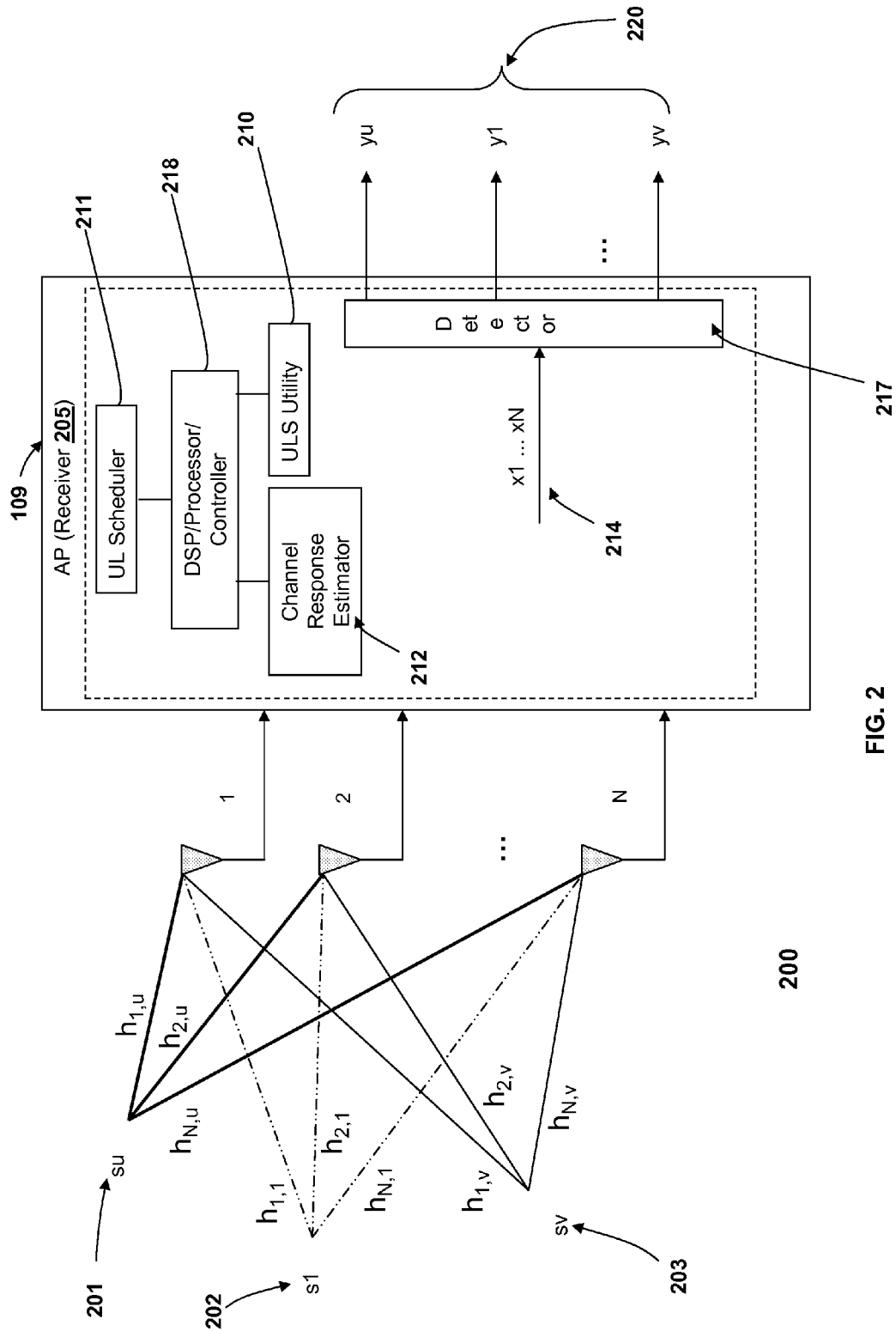
FIG. 2 is a block diagram representation of a receiver and detection mechanism employed by the wireless communication system of FIG. 1 according to one embodiment of the invention.

FIG. 2 is a block diagram of a receiver and detection mechanism employed by the wireless communication system of FIG. 1 according to one embodiment of the invention. System 100 comprises a transmitted signal vector "s" that corresponds to the independent information signals transmitted by the "L" users 101, 102 and 103. For example, as depicted in FIG. 2, vector "s" comprises transmitted signal "su" 201 of user u 101, transmitted signal "s1" 202 of user 1 102, and transmitted signal "sv" 203 of user v 103. Correspondingly, a vector "x" comprises the signals received by AP 109 at each of the "N" antennae, that is, signal "x1" received from antenna 1 105, signal "x2" received from antenna 2 106, and signal "xN" received from antenna N 107. In order to facilitate the following description and explanation of UL SDMA, receiver 205 is illustrated within AP 109 (i.e., the receiver device/component is illustrated, while other components of AP 109, such as a transmitter, are not explicitly shown). Receiver 205 comprises a Processor/DSP/Controller (logic) 218 coupled to each of an uplink scheduling (ULS) utility 210, a UL scheduler 211, and a channel response estimator 212.

In actual implementation, UL scheduler 211 and ULS utility 210 may be combined as a single component to collectively provide the various functions of each individual component. For simplicity, ULS utility 210 is illustrated and described as a stand alone or separate software/firmware component, which provides specific functions, as described below. Channel response estimator 212 provides an estimate (utilizing Equation 701 of FIG. 7) of a channel transfer function vector. Receiver 205 also comprises a detector 217 which receives independent signal components x1 to xN 214 as inputs and yields an output signal vector y 220 (y1 ... yL). Detector 217 may, for example, be a minimum mean square error (MMSE) detector. Vector y 220 is illustrated by components yu, y1, and yv, which components correspond, respectively, to signals su 201, s1 202 and sv 203.

Among the software code/instructions/logic provided by ULS utility 210, and which are specific to the invention, are: (a) logic for utilizing a channel response estimate to compute an efficient pairing metric in the context of a UL SDMA system; (b) logic for computing the pairing metric for assigning/scheduling information signals onto OFDM time-frequency resources; and (c) logic for determining an optimal set of pairings, based on the pairing metric and other priority conditions. For simplicity of the description, the collective body of code that enables these various features is referred to hereinafter as ULS utility 210.

Those of ordinary skill in the art will appreciate that the hardware and basic configuration depicted in FIGS. 1 and 2 may vary. For example, other devices/components may be used in addition to or in place of the hardware depicted. The depicted example is not meant to imply architectural or other limitations with respect to the present invention.

In system 100, the (N×1)-dimensional vector "x" of complex signals received by the N-element antenna array 105, 106, 107 in the k-th subcarrier of the m-th OFDM symbol is constituted by the superposition of the independently faded signals associated with the L users sharing the same space-frequency resource. Thus, "x" may also be referred to as "x[m;k]". The received signal is corrupted by noise ("n") at the array elements. In the forthcoming description, the indices [m;k] have been omitted for notational convenience, yielding:

$$x = HBs + n, \qquad \text{(Equation 1)},$$

where the (N×1)-dimensional vector "x" 214 of received signals, the (L×1)-dimensional vector "s" of transmitted signals and the array noise vector n, respectively, are given by:

$$x = (x1, x2, \ldots xN)^t; \text{(Equation 2, where t is the transpose of the matrix)}$$

$$s = (s1, s2, \ldots sL)^t; \qquad \text{(Equation 3); and}$$

$$n = (n1, n2, \ldots nN)^t, \qquad \text{(Equation 4).}$$

A frequency domain channel transfer function matrix "HB" of dimension 'N×L' is constituted by a set of channel vectors of the L users, each of which hosts the frequency domain channel transfer factors between the single transmitter antenna associated with a particular user, such as users u, 1, and v, and the receiver 205 via the antenna array 105, 106, 107. Regarding the statistical properties of the components associated with the vectors in Equation 1, one may assume that the complex data signal s(v) transmitted by the $v^{th}$ user has zero-mean and unit variance. The noise n(p) at any antenna array element p exhibits zero-mean and a variance of $\sigma^2$. The frequency domain channel transfer function HB(k) of the different users are different fading processes.

FIG. 7 illustrates a set 700 of equations employed in a creation of a UL SDMA pairing metric according to one embodiment of the invention. Equation set 700 comprises Equation 5 701, Equation 6 702, Equation 7 703, and Equation 8 704.

UL SDMA receiver 205 facilitates a separation of the different users whose signals are received by AP 109, such as users u, 1, and v, based on a unique channel transfer function vector as observed through the AP's antenna array 105, 106, 107. An estimate of the channel transfer function vector, "HB", is provided by a sub-carrier "k" frequency domain channel estimate (SFDCE) vector "$H(k)_u$" between user u and each receive antenna 105, 106, 107 at AP 109. SFDCE vector "$H(k)_u$" is provided by Equation 5 701 (FIG. 7). SFDCE vector "$H(k)_u$" may be determined empirically by a sounding processing methodology or may be estimated by using pilots embedded in data traffic. In system 100, users may utilize a variety of modulation code schemes (MCSs) to transmit data to a receiving AP, such as AP 109. One reason for utilizing a variety of MCSs is that each user with a different application may demand a different/unique data rate. In addition, different physical channel environments may be suitable for different modulation schemes that results in lower frame error rate (FER) at a given transmitting power. Furthermore, each user has a different required signal power associated with each different MCS to achieve a target FER. A signal power "P" of each user's signal, such as a signal power $P_u$ with respect to user u, can be determined during calculation of a carrier to interference plus noise ratio (CINR) and radio signal strength indicator (RSSI) or by a power control processing methodology.

In order to select the pairs of user signals that share the same OFDM time-frequency resources, uplink scheduling utility 210 defines a pairing metric, "M", such as a pairing metric "$M(k)_{u,v}$," between user u and user v on sub-carrier k, which pairing metric "$M(k)_{u,v}$" is provided by Equation 7 703, involving normalized coefficients (obtained as absolute values) multiplied by a square root of signal power ratios (Pu/Pv and Pv/Pu). Correlation coefficients "$r_{1,1}$", "$r_{1,2}$", "$r_{2,1}$", "$r_{2,2}$" are elements of a matrix formed by (a cross-correlation of) a vector "$H(k)_u$" and a vector "$H(k)_v$", which vectors are determined with respect to Equation 5 701 and correspond to user u and user v, respectively. These correlation coefficients are determined by Equation 6 702, which yields auto correlation coefficients "$r_{1,1}$" and "$r_{2,2}$" and cross correlation coefficients "$r_{2,1}$" and "$r_{1,2}$". User u and user v may be paired together for UL SDMA on subchannel(s) that are composed of a set of sub-carriers "K", wherein "K" corresponds to the number of sub-carriers in the set, when "$M_{u,v}$" 704 has a value that is less than a threshold maximum value "T". The value of "$M_{u,v}$" 704 is an average of "$M(k)_{u,v}$" based on an evaluation of "$M(k)_{u,v}$" at each of the K sub-carrier frequencies. Values "$M(k)_{u,v}$" and "$M_{u,v}$", derived respectively from Equation 7 703 and Equation 8 704, are both normalized such that these values are both less than "1". For example, "T" may have a value that is within the range of 0.5 and 0.8.

Assuming the number of SDMA users in a cell is L, ULS utility 210 is able to generate a table of pairing metrics, which is an (L−1)-by-(L−1) triangle matrix. The paired users associated with the metric value smaller than "T" may be scheduled for SDMA, based on a relative value of the pairing metric "$M_{u,v}$" (from Equation 8 704), which value accommodates a complete set of compatible and user pairings. These user pairings also enable system 100 to achieve an optimal frame error rate (FER). Thus, ULS utility 210 allows each of the L/2 pairings of the set of L users to be paired exclusively within a frame defined by a particular time-slot and specific sub-carrier frequency. The resultant FER may be dependent upon quality of service (QoS) requirements of associated applications for each user signal. However, when all other conditions are equal and/or, based on equal priority, do not impact the order of scheduling, ULS utility 210 schedules the pairings into the timeslots based on the relative value of the pairing metric ("$M_{u,v}$", Equation 8 704). In other words, ULS utility 210 pairs and schedules information signals that have a minimal correlation for a first OFDM time slot. Thus, in the context of the detector 217 (e.g., an MMSE detector), the selected pairings ultimately increases an ability of the detector to distinguish/de-correlate and recover each one of the individual transmitted signals from the received signals.

Figure 3:
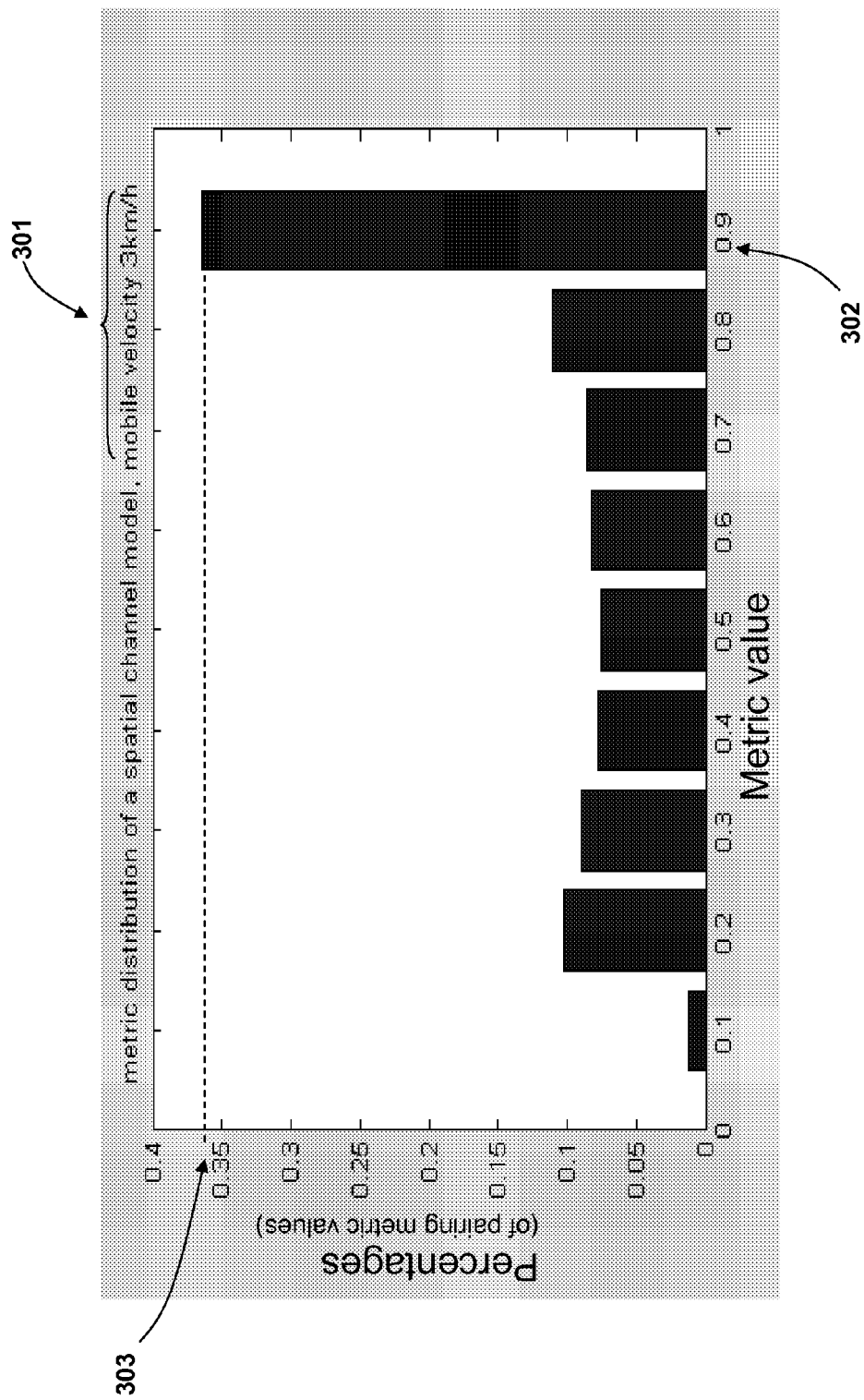
FIG. 3 is a first graph illustrating the distribution of pairing metric values according to one embodiment of the invention.
Figure 4:
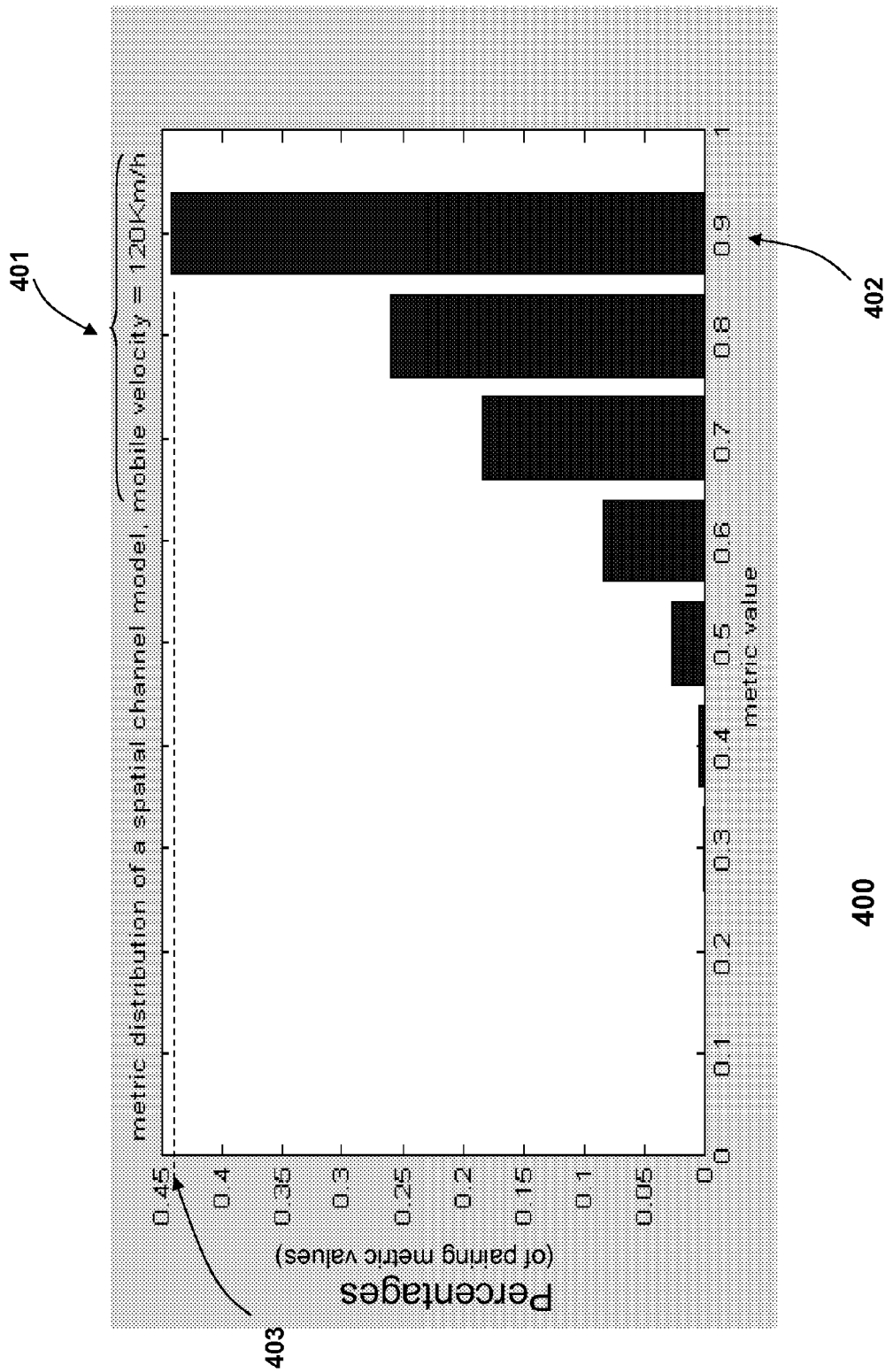
FIG. 4 is a second graph illustrating the distribution of pairing metric values according to one embodiment of the invention.

The performance gain attained by the UL collaborative SDMA scheduling method with the implementation of the pairing metric is demonstrated by the simulation results presented in the following figures. FIG. 3 and FIG. 4 show distribution of the pairing metric values under different spatial channels.

FIG. 3 is a graph 300 illustrating the distribution of pairing metric values, according to one embodiment of the invention. Graph 300 comprises a number of metric values which are distributed between 0 and 1 for two randomly located users with mobile velocity of 3 kilometers per hour (km/h) (velocity 301) under a particular channel condition. A horizontal axis of FIG. 3 represents pairing metric values, and more particularly depicts pairing metric value ranges such as ranges from 0.05 to 0.15, 0.15 to 0.25, 0.25 to 0.35, and so on. A vertical axis of FIG. 3 represents a percentage of the pairing metric values that fall within each given pairing metric value range. For example, metric 302 is an example of a metric value that shows that approximately 36% (indicated by distribution line [0.36] 303) of the pairing metric values are roughly between 0.85 and 0.95 in the simulated case. If the threshold T is 0.85, this distribution implies the chance that any two users can be paired for UL SDMA in the simulated scenario is 64%. Since all pairing metric values are between 0 and 1, given a fixed FER, the corresponding user pairings performed by ULS utility 210 is simplified, since a signal threshold T is utilized to further reduce the number of possible pairings that are considered for scheduling. For a different target FER, there is a different associated threshold value. The smaller the value of T, the lower the FER will be. However, there is a lower chance of any two users being paired for UL SDMA transmission.

FIG. 4 is a graph 400 illustrating a different distribution of pairing metric values, according to one embodiment of the invention. Similar to FIG. 3, a horizontal axis of FIG. 4 represents pairing metric values, and more particularly depicts pairing metric value ranges such as ranges from 0.05 to 0.15, 0.15 to 0.25, 0.25 to 0.35, and so on, and a vertical axis of FIG. 4 represents a percentage of the pairing metric values that fall within each given pairing metric value range. Graph 400 comprises a number of metric values which are distributed between 0 and 1 for two randomly located mobile users with an average mobile velocity of 120 kilometers per hour (km/h) (velocity 401). Metric 402 is an example of a metric value illustrated in graph 400, which shows that 44% (indicated by line 403) of the pairing metric values are approximately between 0.85 and 0.95 in the simulated case. Again, if the threshold T is 0.85, this distribution implies the chance that any two users can be paired for UL SDMA in the simulated scenario is 56%.

In the following description, the acronym QAM refers to quadrature amplitude modulation; QPSK refers to quadrature phase shift keying; CTC refers to convolutional turbo coded; and SNR refers to signal to noise ratio. The fraction appended to the modulation type refers to a code rate parameter. Thus, with reference to "QPSK½ CTC", the fraction "½" refers to a code rate parameter of ½.

Figure 5:
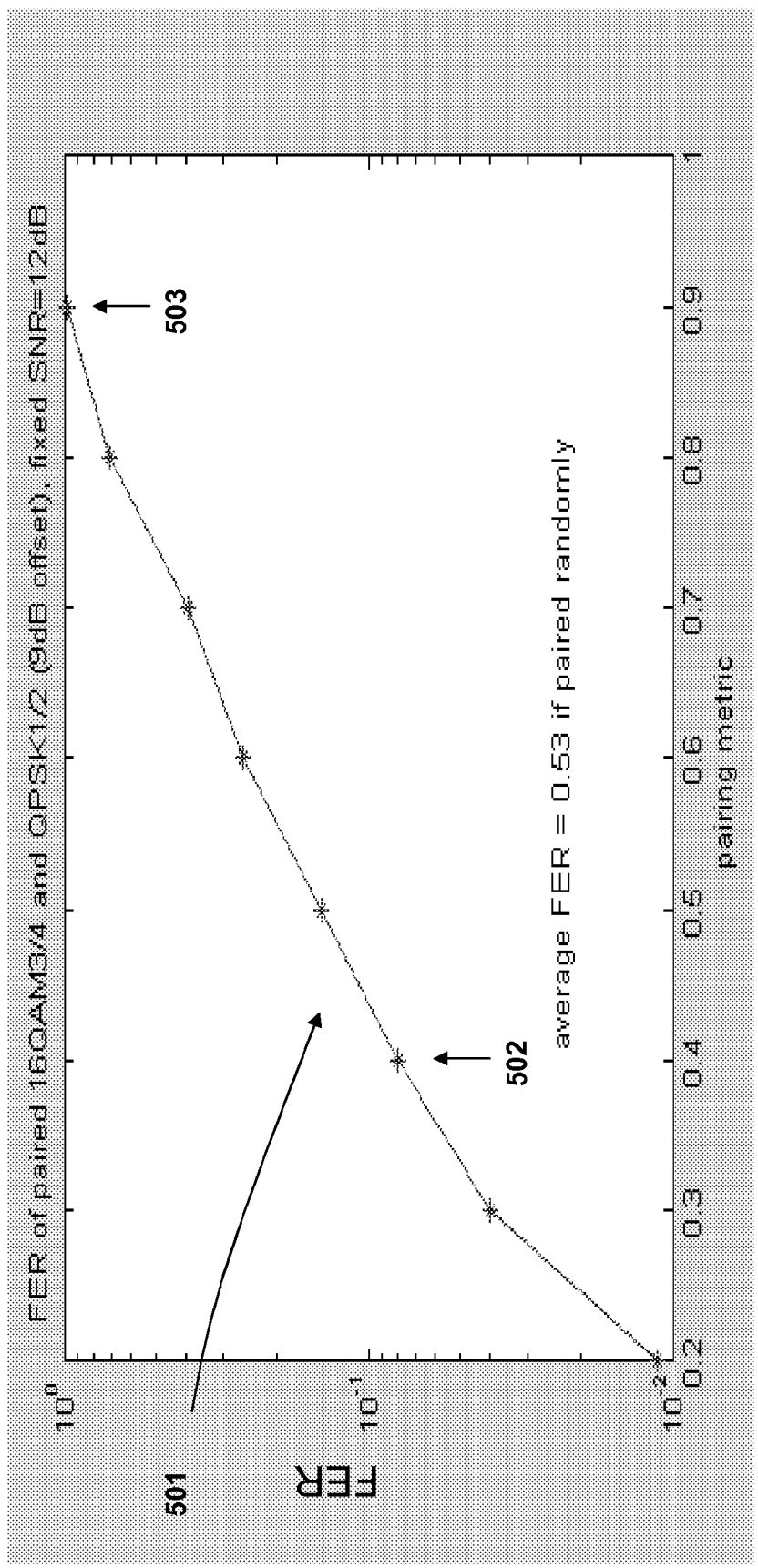
FIG. 5 is a third graph illustrating the frame error rate (FER) distribution of two randomly located users with different modulation code schemes (MCSs) according to one embodiment of the invention.

FIG. 5 is a graph 500 illustrating a frame error rate (FER) of two randomly located users with 16QAM¾ CTC signals and QPSK½ CTC signals, according to one embodiment of the invention. A horizontal axis of FIG. 5 represents pairing metric values, and a vertical axis of FIG. 5 represents FERs corresponding to the pairing metric values. A first plot 501 of graph 500 shows the aggregate FER of the two randomly located users with 16QAM¾ CTC and QPSK½ CTC respectively plotted against the value of the pairing metric for a fixed receive SNR at 12 dB and a power offset of 9 dB. That is, as shown by the graph, a received power of 16QAM user is 9 dB higher than that of QPSK user. Plot 501 demonstrates that the FER of paired SDMA users depends on the value of the pairing metric, given a fixed transmit power. This dependence of the FER on the value of the pairing metric validates the fundamental idea of the pairing metric. For example, a first metric value 502 with a metric value of 0.4 has an FER of 0.08, whereas a second metric value 503 with a metric value of 0.9 has an FER of 1. Plot 501 also demonstrates that the average FER is equal to 0.53 if the user signals are randomly paired.

Figure 6:
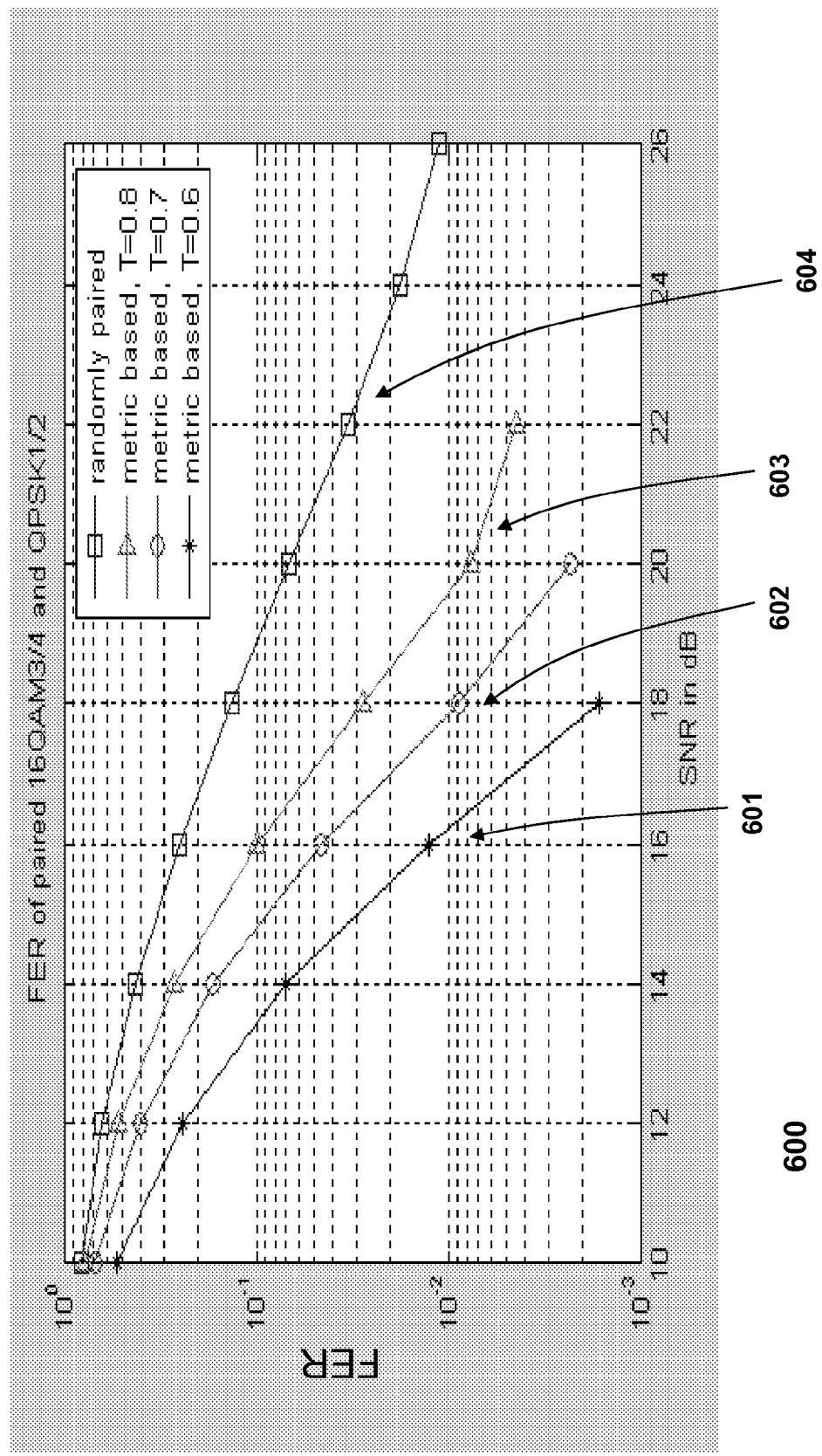
FIG. 6 is a fourth graph illustrating the frame error rate (FER) distribution of two randomly located users with different modulation code schemes (MCSs) and with different pairing metric thresholds according to one embodiment of the invention.

FIG. 6 is a graph 600 illustrating a frame error rate (FER) distribution of randomly located users with 16QAM¾ CTC signals and QPSK½ CTC signals with different pairing metric thresholds, plotted against SNR, according to one embodiment of the invention. That is, a horizontal axis of FIG. 6 represents SNR values, in dB, and a vertical axis of FIG. 6 represents FERs corresponding to the SNR values. Graph 600 comprises a first plot 601, a second plot 602, and a third plot 603, which respectively illustrate the FER corresponding to SNR values for three different metric based pairing thresholds, with T=0.6, T=0.7, and T=0.8. Graph 600 also comprises a fourth plot 604, illustrating the FER corresponding to SNR values for randomly paired users/signals These plots compare the FER of randomly paired/located 16QAM¾ CTC and QPSK½ CTC signals (with a power offset of 9 dB) with metric pairings determined by ULS utility 210. Further, graph 600 depicts the performance of the signal pairings (1) scheduled by the original blind/random method, corresponding to fourth plot 604 and (2) paired using the pairing metric for UL SDMA, corresponding to first plot 601, second plot 602, and third plot 603.

Graph 600 demonstrates that implementation of scheduling using the pairing metric achieves a significant improvement over blind, or random, scheduling, as fourth plot 604, corresponding to blind scheduling, has a worse performance (i.e., larger FER) compared to the performances (i.e., lower FER) of first plot 601, second plot 602 and third plot 603. In addition, the threshold "T" plays an important role, that is, the smaller the value of "T", the lower the FER. For example, first plot 601, which sets T to a value of 0.6, has a better performance than third plot 603, which sets T to a value of 0.8. However, a smaller value of "T" implies a smaller probability of two particular users being paired together for UL SDMA. In general, "T" may be set small (e.g., T=0.5) if the number of SDMA users in a cell is large (i.e., many possible compatible pairings). Otherwise "T" may be set to a relatively large value (e.g., T=0.8) when the number of SDMA users is smaller.

Figure 8:
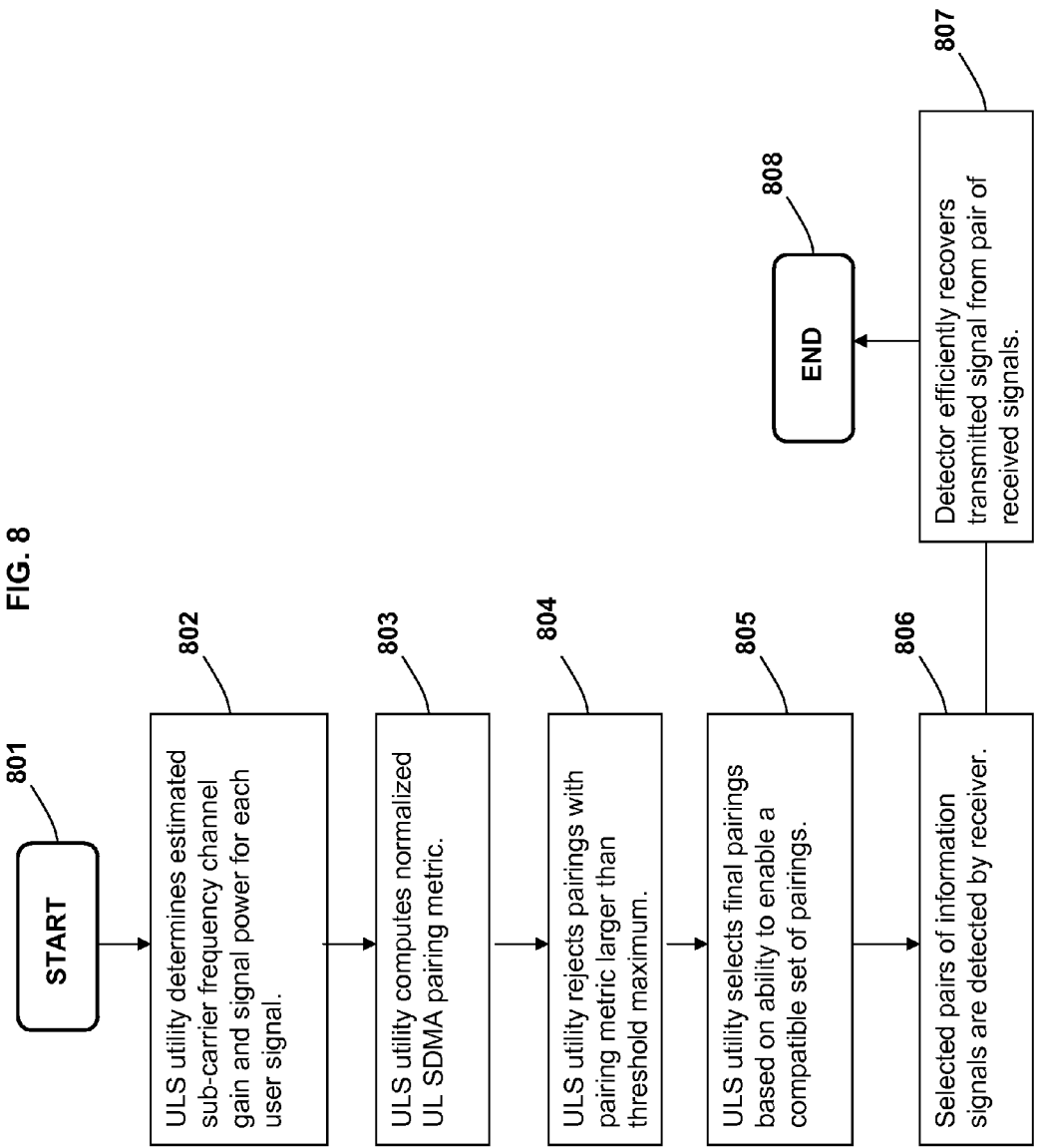
FIG. 8 is a flow chart illustrating the method by which the UL SDMA pairing metric is implemented and executed according to one embodiment of the invention.

FIG. 8 is a flow chart illustrating the method by which the above processes of the illustrative embodiments are completed, in one embodiment. Although the method illustrated in FIG. 8 may be described with reference to components shown in FIGS. 1-7, it should be understood that this is merely for convenience and alternative components and/or configurations thereof can be employed when implementing the various methods. Key portions of the methods may be completed by ULS utility 210 executing within AP 109 (FIG. 1) or receiver 205 (FIG. 2) and controlling specific operations of/on AP 109, and the method is thus described from the perspective of either/both ULS utility 210 and receiver 205.

The process of FIG. 8 begins at initiator block 801 and proceeds to block 802, at which ULS utility 210 determines the sub-carrier frequency channel response/gain and the information signal power corresponding to the signal paths of a number of subscribers. For example, in system 100, each of the L users transmits information signals that are received by the N antennas at the receiving AP 109. At block 803, ULS utility 210 computes multiple normalized pairing metric values, which corresponds to multiple possible assignments of paired signal combinations to respective OFDM channel resources (or resource sets) for UL collaborative SDMA, wherein individual signals are paired together for transmission scheduling based on clear spatial distinctions. The computation of the normalized pairing metric values allows the UL scheduler 211 to select a compatible set of users, that is, UL signal pairings, for UL collaborative SDMA. ULS utility 210 rejects those pairings that have an associated pairing metric that exceeds a preset threshold maximum value, while the remaining pairings, that is, the possible assignments of paired signal combinations, are considered, as shown at block 804. At block 805, ULS utility 210 selects the final pairings, that is, a final set of compatible assignments of exclusive paired signaling combinations, from among the remaining pairings based on the ability of the final pairings to enable a compatible set of pairings which yields an optimal performance. The selection of the final pairings are based on pre-established criteria, such as a pairing metric value associated with the pairing relative to pairing metric values associated with the other pairings and/or a set of priority requirements, for example, quality of service (QoS) requirements.

The selected final pairs of users/UL signals are then allocated, and utilize, the appropriate time-frequency ODFM resources (i.e., OFDM symbols and sub-carriers), wherein paired signal combinations not within the final set are not utilized, and are detected at a number of antennas at receiver 205, as shown at block 806. Receiver 205 then receives a plurality of signals transmitted from two or more user devices, wherein the signals are received in the paired signal combinations over the respective assigned channel resource sets. At receiver 205, detector 217 is able to efficiently recover transmitted independent signals from the pairs of received signals, at block 807. Detector 217 is able to distinguish each of the individual signals in the pairing as a result of the selection process utilized by ULS utility 210, which pairs signals that have a clear spatial distinction. The process ends at block 808.

In one embodiment, the pairing metric value evaluates a feasibility of an assignment of a paired signal combination to a corresponding OFDM resource set, prior to signal reception by a multiple antenna access point (AP) receiver for UL SDMA; the priority requirements include one or more of: (1) quality of service (QoS) requirements; and (2) an estimated collective error rate of the final set of compatible assignments; and the independent signals are transmitted by user devices over channels, wherein one of the channels is allocated to a pair of said independent signals.

In the flow chart above, one or more aspects of the method may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As provided by the above description of the embodiments and the method illustrated by FIG. 8, the computing step further comprises: (a) calculating a set of coefficient values, wherein the values correspond to a possible assignment of a paired signal combination and wherein the OFDM resource sets include one of a channel and a sub-channel defined by frequency and time; obtaining a pair of signal power values corresponding to the possible assignment of the paired signal combination; computing a pairing metric value for the possible assignment of the paired signal combination to the corresponding OFDM resource set; and determining the average of the plurality of pairing metric values for the possible assignments of the paired signal combination. In one embodiment, the computing step involves applying, to a computation of the pairing metric value, one or more of the following: (1) respective signal power values of a pair of independent signals of the paired signal combination; (2) a corresponding pair of correlation coefficients; and (3) a corresponding pair of normalization coefficients, wherein said pair of normalization coefficients limits a value of the pairing metric to a range between "0" and "1".

Additionally, the obtaining step further comprises: calculating a pair of signal power values utilizing one or more of: (1) a power control process; and (2) a carrier to interference plus noise ratio (CINR) and radio signal strength indicator (RSSI) estimation process. And, the calculating further comprises: determining a first set of correlation coefficient values, wherein the values measure a spatial disparity between the two independent signals of the paired signal combination; calculating a second set of normalization coefficient values; and providing the paired signal combinations using independent signals with characteristics that enable an efficient recovery of independent signals from the pairs of received signals. The calculating step also includes: obtaining the second set of normalization coefficients by performing a pairing matrix computations, which involves a pair of SFDCE vectors, corresponding to a pair of independent signals from the paired signal combination.

In one embodiment, the determining step further comprises: obtaining the first set of correlation coefficients by performing a cross-correlation computation which involves a pair of sub-carrier frequency domain channel estimate (SFDCE) vectors corresponding to the paired signal combination. In another embodiment, the determining step also comprises: comparing the computed pairing metric value to a pre-determined threshold maximum value; and when the computed pairing metric value is greater than the threshold maximum value, removing the paired signal combination from the plurality of possible assignments of paired signal combinations, wherein the assignments to resource sets of signal pairings in the final set are based on a lower estimated collective error rate performance of signal pairings of the final set of compatible assignments relative to respective error rate performance of the plurality of possible assignments of paired signal combinations.

Finally, in one embodiment, the method also comprises: calculating, for an independent signal, an SFDCE vector, wherein said calculating involves deriving the SFDCE vector by one or more of: (1) an empirical sound processing method; and (2) an empirical method, which embeds pilot signals in data traffic; and evaluating the SFDCE vector based on a corresponding group of sub-carrier frequencies; wherein the SFDCE vector corresponds to a transmission path between a mobile transmitter of one of a number of independent signals and an access point (AP) receiver; and wherein the SFDCE vector provides a measure of a channel gain between a corresponding mobile transmitter and the multiple antenna AP receiver.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a wireless communication system employing uplink (UL) spatial division multiple access (SDMA), a method comprising:

computing a plurality of pairing metric values, which corresponds to a plurality of possible assignments of paired signal combinations to respective orthogonal frequency division multiplexing (OFDM) channel resource sets for UL collaborative SDMA, wherein individual signals are paired together for transmission scheduling based on clear spatial distinctions and minimum correlation, further wherein the plurality of pairing metrics values are computed for a plurality of sets of paired signal combinations;

determining a final set of compatible assignments of exclusive paired signal combinations from the plurality of possible assignments based on pre-established criteria including one or more of: (1) a relative value of the pairing metric values; and (2) a set of priority requirements;

allocating the final set of compatible assignments for transmission of the paired signal combinations utilizing the respective OFDM resource sets, wherein paired signal combinations that are not within the final set are not utilized; and receiving a plurality of signals transmitted from two or more user devices, wherein said signals are received in the paired signal combinations over the respective assigned channel resource sets.

2. The method of claim 1, wherein said computing further comprises:

calculating a set of coefficient values, wherein said values correspond to a possible assignment of a paired signal combination;

wherein the OFDM resource sets include one of a channel and a sub-channel defined by frequency and time;

obtaining a pair of signal power values corresponding to the possible assignment of the paired signal combination;

computing a pairing metric value for the possible assignment of the paired signal combination to the corresponding OFDM resource set; and determining the average of the plurality of pairing metric values for the possible assignments of the paired signal combination.

3. The method of claim 2, wherein said obtaining further comprises:

calculating a pair of signal power values utilizing one or more of: (1) a power control process; and (2) a carrier to interference plus noise ratio (CINR) and radio signal strength indicator (RSSI) estimation process.

4. The method of claim 2, wherein said calculating further comprises:

determining a first set of correlation coefficient values, wherein said values measure a spatial disparity between the two independent signals of the paired signal combination;

calculating a second set of normalization coefficient values; and providing the paired signal combinations using independent signals with characteristics that enable an efficient recovery of independent signals from the pairs of received signals.

5. The method of claim 4, wherein said determining further comprises:

obtaining the first set of correlation coefficients by performing a cross-correlation computation which involves a pair of sub-carrier frequency domain channel estimate (SFDCE) vectors corresponding to the paired signal combination.

6. The method of claim 4, wherein said calculating further comprises:

obtaining the second set of normalization coefficients by performing a pairing matrix computation, which involves a pair of SFDCE (sub-carrier frequency domain channel estimate) vectors corresponding to a pair of independent signals from the paired signal combination.

7. The method of claim 2, wherein said computing further comprises applying, to a computation of the pairing metric value, one or more of the following (1) respective signal power values of a pair of independent signals of the paired signal combination;

(2) a corresponding pair of correlation coefficients; an (3) a corresponding pair of normalization coefficients, wherein said pair of normalization coefficients limits a value of the pairing metric to a range between "0" and "1".

8. The method of claim 1, wherein said determining further comprises:

comparing the computed pairing metric value to a predetermined threshold maximum value; and when the computed pairing metric value is greater than the threshold maximum value, removing the paired signal combination from the plurality of possible assignments of paired signal combinations;

wherein the assignments to resource sets of signal pairings in the final set are based on a lower estimated collective error rate performance of signal pairings of the final set of compatible assignments relative to respective error rate performance of the plurality of possible assignments of paired signal combinations.

9. The method of claim 1, wherein the pairing metric value of a paired signal combination evaluates a feasibility of an assignment of the paired signal combination to a corresponding OFDM resource set, prior to signal reception by a multiple antenna access point (AP) receiver for UL SDMA;

said priority requirements include one or more of: (1) quality of service (QoS) requirements; and (2) an estimated collective error rate of the final set of compatible assignments; and said independent signals are transmitted by user devices over channels, wherein one of said channels is allocated to a pair of said independent signals.

10. The method of claim 1, further comprising:

calculating, for an independent signal, an SFDCE (sub-carrier frequency domain channel estimate) vector, wherein said calculating involves deriving the SFDCE vector by one or more of: (1) an empirical sound processing method; and (2) an empirical method, which embeds pilot signals in data traffic; and evaluating the SFDCE vector based on a corresponding group of sub-carrier frequencies;

wherein the SFDCE vector corresponds to a transmission path between a mobile transmitter of one of a number of independent signals and an access point (AP) receiver; and wherein the SFDCE vector provides a measure of a channel gain between a corresponding mobile transmitter and the multiple antenna AP receiver.

11. A wireless communication system comprising:

a processor;

a multiple antenna receiver system, which receives a plurality of signals transmitted by a plurality of single antenna devices;

a scheduler;

a detection mechanism; and a utility which when executed by the processor provides the following functions of:

computing a plurality of pairing metric values, which corresponds to a plurality of possible assignments of paired signal combinations to respective orthogonal frequency division multiplexing (OFDM) channel resource sets for UL collaborative SDMA, wherein individual signals are paired together for transmission scheduling based on clear spatial distinctions and minimum correlation, further wherein the plurality of pairing metrics values are computed for a plurality of sets of signal combinations;

determining a final set of compatible assignments of exclusive paired signal combinations from the plurality of possible assignments based on pre-established criteria including one or more of: (1) a relative value of the pairing metric values; and (2) a set of priority requirements;

allocating the final set of compatible assignments for transmission of the paired signal combinations utilizing the respective OFDM resource sets, wherein paired signal combinations that are not within the final set are not utilized; and receiving a plurality of signals transmitted from two or more user devices, wherein said signals are received in the paired signal combinations over the respective assigned channel resource sets.

12. The system of claim 11, wherein said computing further comprises:

calculating a set of coefficient values, wherein said values correspond to a possible assignment of a paired signal combination;

wherein the OFDM resource sets include one of a channel and a sub-channel defined by frequency and time;

obtaining a pair of signal power values corresponding to the possible assignment of the paired signal combination;

computing a pairing metric value for the possible assignment of the paired signal combination to the corresponding OFDM resource set; and determining the average of the plurality of pairing metric values for the possible assignments of the paired signal combination.

13. The system of claim 12, wherein said obtaining further comprises:

calculating a pair of signal power values utilizing one or more of: (1) a power control process; and (2) a carrier to interference plus noise ratio (CINR) and radio signal strength indicator (RSSI) estimation process.

14. The system of claim 12, wherein said calculating further comprises:

determining a first set of correlation coefficient values, wherein said values measure a spatial disparity between the two independent signals of the paired signal combination;

calculating a second set of normalization coefficient values; and providing the paired signal combinations using independent signals with characteristics that enable an efficient recovery of independent signals from the pairs of received signals.

15. The system of claim 14, wherein said determining further comprises:

obtaining the first set of correlation coefficients by performing a cross-correlation computation which involves a pair of sub-carrier frequency domain channel estimate (SFDCE) vectors corresponding to the paired signal combination.

16. The system of claim 14, wherein said calculating further comprises:

obtaining the second set of normalization coefficients by performing a pairing matrix computation, which involves a pair of SFDCE (sub-carrier frequency domain channel estimate) vectors corresponding to a pair of independent signals from the paired signal combination.

17. The system of claim 12, wherein said computing further comprises applying, to a computation of the pairing metric value, one or more of the following:

(1) respective signal power values of a pair of independent signals of the paired signal combination;

(2) a corresponding pair of correlation coefficients; and (3) a corresponding pair of normalization coefficients, wherein said pair of normalization coefficients limits a value of the pairing metric to a range between "0" and "1".

18. The system of claim 11, wherein said determining further comprises:

comparing the computed pairing metric value to a predetermined threshold maximum value; and when the computed pairing metric value is greater than the threshold maximum value, removing the paired signal combination from the plurality of possible assignments of paired signal combinations;

wherein the assignments to resource sets of signal pairings in the final set are based on a lower estimated collective error rate performance of signal pairings of the final set of compatible assignments relative to respective error rate performance of the plurality of possible assignments of paired signal combinations.

19. The system of claim 11, wherein:

the pairing metric value of a paired signal combination evaluates a feasibility of an assignment of the paired signal combination to a corresponding OFDM resource set, prior to signal reception by a multiple antenna access point (AP) receiver for UL SDMA;

said priority requirements include one or more of: (1) quality of service (QoS) requirements; and (2) an estimated collective error rate of the final set of compatible assignments; and said independent signals are transmitted by user devices over channels, wherein one of said channels is allocated to a pair of said independent signals.

20. The system of claim 11, further comprising:

calculating, for an independent signal, an SFDCE (sub-carrier frequency domain channel estimate) vector, wherein said calculating involves deriving the SFDCE vector by one or more of: (1) an empirical sound processing method; and (2) an empirical method, which embeds pilot signals in data traffic; and evaluating the SFDCE vector based on a corresponding group of sub-carrier frequencies;

wherein the SFDCE vector corresponds to a transmission path between a mobile transmitter of one of a number of independent signals and an access point (AP) receiver; and wherein the SFDCE vector provides a measure of a channel gain between a corresponding mobile transmitter and the multiple antenna AP receiver.

* * * * *